(12) United States Patent
Hong et al.

(10) Patent No.: US 7,795,775 B2
(45) Date of Patent: Sep. 14, 2010

(54) MOTOR STATOR

(75) Inventors: Chien-Long Hong, Taipei Hsien (TW); Xu Dong, Shenzhen (CN); Chou-Chen Shih, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 364 days.

(21) Appl. No.: 11/940,922

(22) Filed: Nov. 15, 2007

(65) Prior Publication Data

US 2009/0039730 A1    Feb. 12, 2009

(30) Foreign Application Priority Data

Aug. 8, 2007    (CN) .......................... 2007 1 0075638

(51) Int. Cl.
*H02K 1/12* (2006.01)
(52) U.S. Cl. ......................................... 310/257; 310/90
(58) Field of Classification Search ................. 310/257, 310/90, 43; *H02K 1/12*
See application file for complete search history.

(56) References Cited

U.S. PATENT DOCUMENTS

| | | | | |
|---|---|---|---|---|
| 5,567,998 A | * | 10/1996 | Ineson et al. .................. | 310/90 |
| 5,770,907 A | * | 6/1998 | Danish et al. .................. | 310/90 |
| 6,031,304 A | * | 2/2000 | Suzuki et al. ............. | 310/49.08 |
| 6,201,324 B1 | | 3/2001 | Suzuki et al. | |
| 6,710,503 B2 | | 3/2004 | Yamawaki et al. | |
| 2004/0145269 A1 | * | 7/2004 | Barrho et al. ................ | 310/257 |
| 2004/0189113 A1 | * | 9/2004 | Kuribara ................... | 310/67 R |

FOREIGN PATENT DOCUMENTS

| | | |
|---|---|---|
| CN | 2309664 Y | 3/1999 |
| CN | 2348525 Y | 11/1999 |
| JP | 9-56141 A | 2/1997 |

* cited by examiner

*Primary Examiner*—Quyen Leung
*Assistant Examiner*—Naishadh N Desai
(74) *Attorney, Agent, or Firm*—Jeffrey T. Knapp

(57) ABSTRACT

A motor stator includes a claw-pole assembly (20), a fixing structure (10) and a sleeve bearing (60). The claw-pole assembly includes a pair of yokes (20a, 20b) each having a plurality of pole teeth (24) intermeshed with those of the other yoke. A gap (29) is defined between two neighboring teeth. The fixing structure is made of plastic material integral with the yokes by insert molding, including a connecting portion (70) contained in the gaps, a base (30) formed at an end of the claw-pole assembly, and a tube (50) extending from the base into the claw-pole assembly. The sleeve bearing is fixedly embedded in the tube during the process of insert molding the fixing structure to the yokes.

10 Claims, 3 Drawing Sheets

MOTOR STATOR

BACKGROUND OF THE INVENTION

1. Field of the Invention

The present invention relates generally to motors, and more particularly to a stator for use in a claw pole permanent magnet motor. The present invention relates also to a method for making the stator.

2. Description of Related Art

Recently, remarkable progress has been made in miniaturization of various devices. Accordingly, various devices have adopted a plurality of specific motors as required for their functions. Step motors are best suited in particular for positioning control.

Usually a step motor includes a stator with windings wound therearound, and a rotor disposed rotatably inside the stator. The stator includes a pair of stator yokes facing towards each other. Each of the yokes includes a plurality of pole teeth extending perpendicularly therefrom. The pole teeth of the two yokes are intermeshed with each other with a gap therebetween, and cooperatively form a cylinder so that the windings can wind thereon. Resin is contained in the gaps of the pole teeth of the two yokes to fix the two yokes together. A bearing seat is arranged in the stator receiving a bearing therein. The rotor has a shaft being rotatably received in the bearing and a shell arranged around the shaft. A tube is arranged between the bearing and the shell to support the shell thereon.

However, as the tube and the bearing consisting of the support of the rotor are not integral, which causes the mounting of the rotor to the stator to be laborious; furthermore, it is difficult to precisely assemble the bearing, the tube and the rotor separately on the stator; when one of the parts is mounted with a positional error, the performance of the whole motor is adversely affected. For the foregoing reasons, therefore, there is a need in the art for a motor which overcomes the above-mentioned problems.

SUMMARY OF THE INVENTION

The present invention relates, in one aspect, to a motor stator. The motor stator includes at least one claw-pole assembly for coils wound thereon, a fixing structure and a sleeve bearing. The at least one claw-pole assembly includes a pair of yokes facing towards each other. Each of the yokes is ring-shaped and has a plurality of pole teeth extending therefrom. The pole teeth of the two yokes are intermeshed with each other with a gap defined therebetween, and are arranged in alternating fashion along a circumferential direction of the yokes to cooperatively form a cylinder-shaped sidewall for the coils to wind therearound. The sidewall defines an inner space for receiving a rotor therein. The fixing structure is made of plastic material integrally by insert molding, including a connecting portion contained in the gaps between the pole teeth, a base formed at an end of the inner space, and a tube extending from the base into the inner space. The sleeve bearing is fixedly embedded in the tube during the process of insert molding the fixing structure to the yokes and the sleeve bearing. The sleeve bearing defines a bearing hole for rotatably supporting a shaft of the rotor.

The present invention relates, in another aspect, to a method for making the motor stator. The method includes steps of: providing at least one claw-pole assembly and a sleeve bearing, the at least one claw-pole assembly having a plurality of pole teeth defining gaps therebetween; mounting the bearing and the at least one claw-pole assembly into a mold and arranging the bearing in a center of the at least one claw-pole assembly; insert molding a fixing structure into the mold, whereby the bearing and the at least one claw-pole assembly are fixedly connected together by the fixing structure during the inserting molding process, the fixing structure filling in the gaps of at least one claw-pole assembly and forming a tube in which the sleeve bearing therein is embedded.

Other advantages and novel features of the present invention will be drawn from the following detailed description of a preferred embodiment of the present invention with attached drawings, in which:

BRIEF DESCRIPTION OF THE DRAWINGS

Many aspects of the present motor stator can be better understood with reference to the following drawings. The components in the drawings are not necessarily drawn to scale, the emphasis instead being placed upon clearly illustrating the principles of the present motor stator. Moreover, in the drawings, like reference numerals designate corresponding parts throughout the several views.

DETAILED DESCRIPTION OF THE INVENTION

Figure 1:
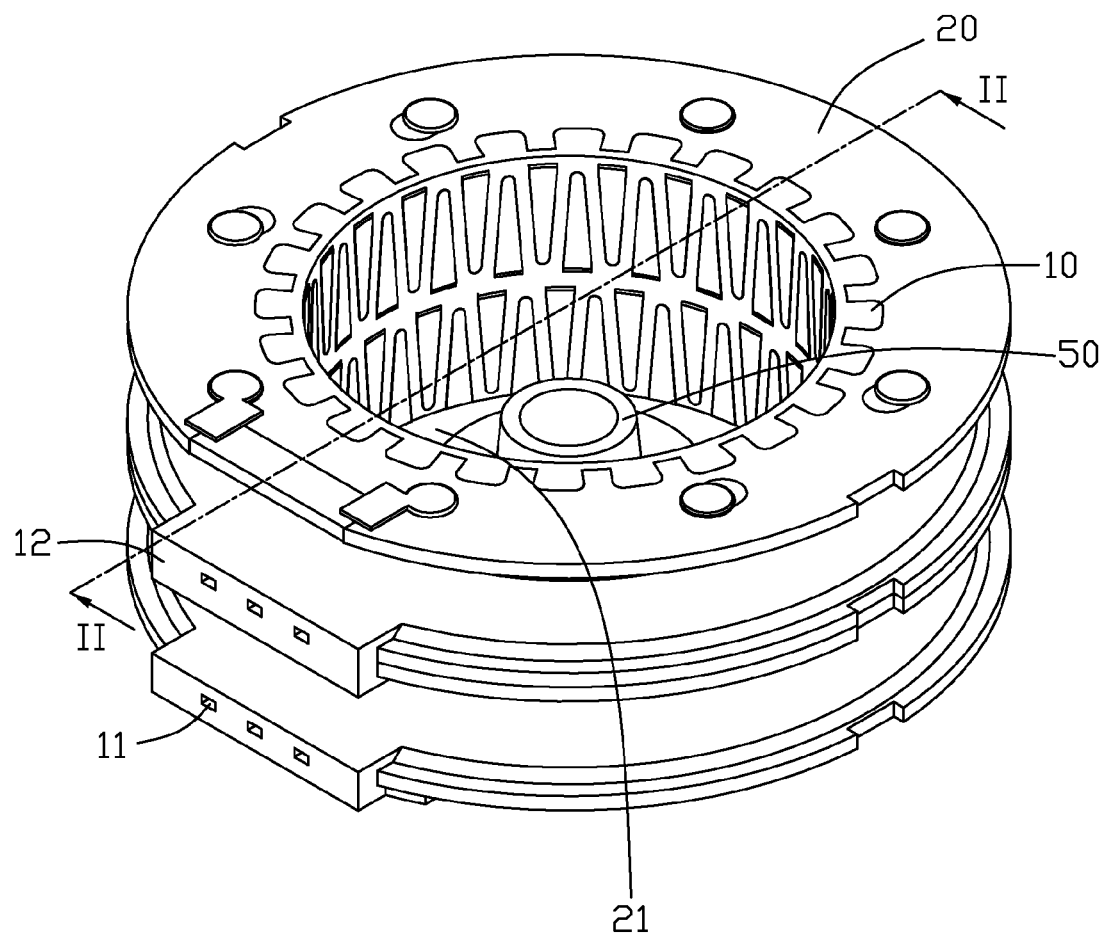
FIG. 1 is an isometric, assembled view of a motor stator in accordance with a preferred embodiment of the present invention.
Figure 2:
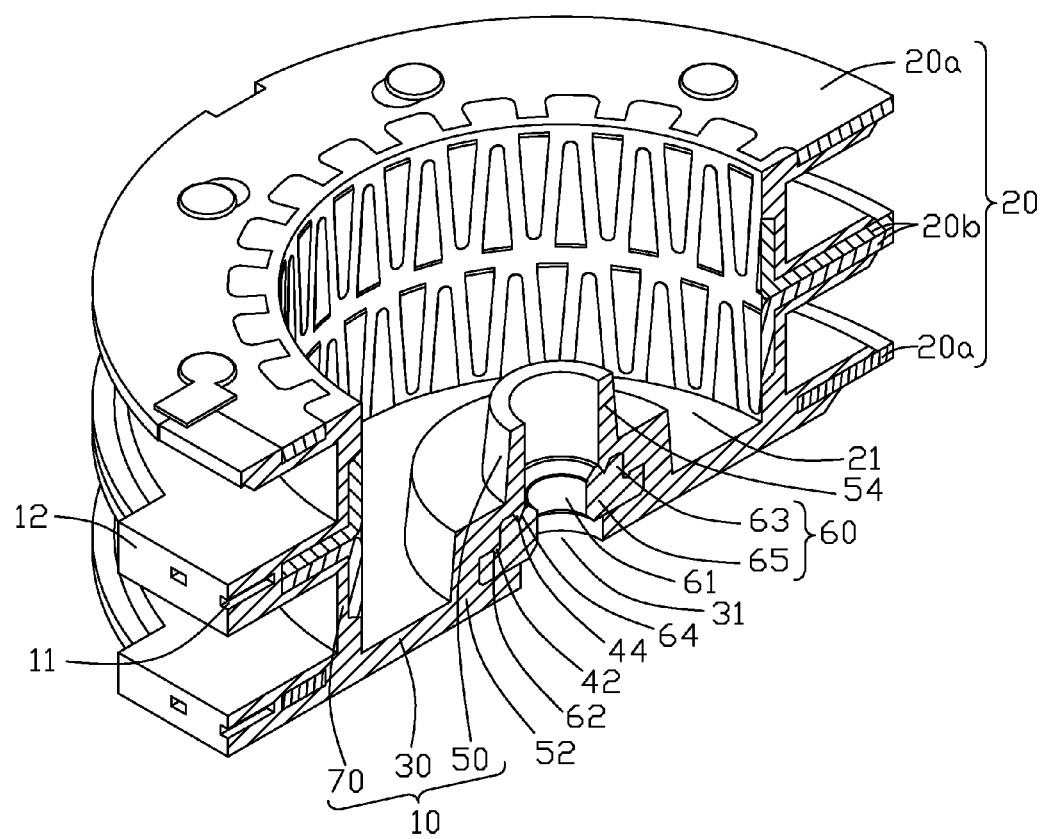
FIG. 2 is an cross-sectional view of the motor stator of FIG. 1 taken along line II-II thereof.
Figure 3:
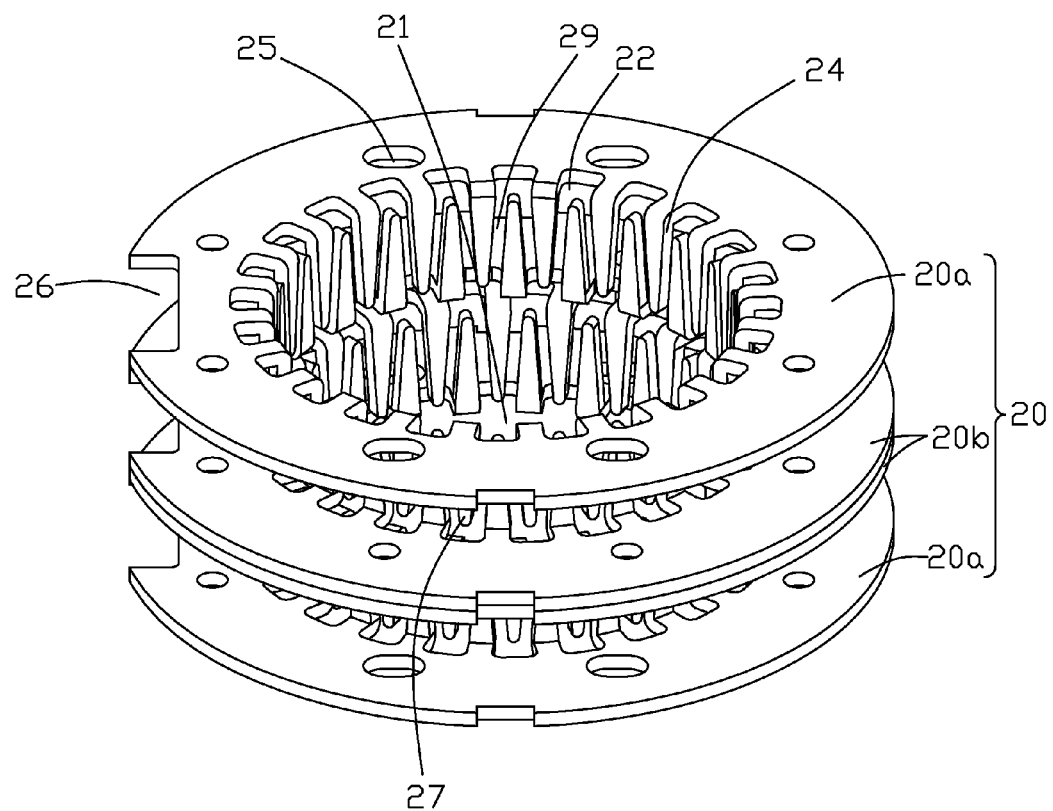
FIG. 3 shows an isometric view of claw-pole assemblies of the motor stator before they are fixedly assembled together.

Referring to FIGS. 1-3, a motor stator according to a preferred embodiment can be used in a claw pole permanent-magnet motor which includes a rotor (not shown) disposed rotatably inside the stator. The stator includes two claw-pole assemblies 20 (i.e., an upper claw-pole assembly and a lower claw-pole assembly) arranged back-to-back, a sleeve bearing 60, and a fixing structure 10.

Each of the claw-pole assemblies 20 includes an outer yoke 20a and an inner yoke 20b facing towards each other. Each of the yokes 20a, 20b of the claw-pole assemblies 20 is ring-shaped with a circular hole (not labeled) defined therein. A plurality of pole teeth 24 extends perpendicularly from an inner circumference of each yoke 20a, 20b. The pole teeth 24 of each yoke 20a, 20b are evenly spaced from each other along a circumferential direction thereof and thus define a plurality of slots 22 therebetween. Each of the slots 22 has a size a little larger than that of the teeth 24 so as to receive a corresponding tooth 24 of the other yoke 20a, 20b therein. A plurality of through holes 25 are defined in each of the yokes 20a, 20b. The through holes 25 have different shapes and sizes. A square-shaped cutout 26 is defined in an outer periphery of each yoke 20a, 20b of the claw-pole assemblies 20.

Each outer yoke 20a combines with a corresponding inner yoke 20b to form a claw-pole assembly 20. The pole teeth 24 of one of the two yokes 20a, 20b of each claw-pole assembly 20 are received in the slots 22 of the other one of the yokes 20b, 20a; thus, the pole teeth 24 of the two yokes 20a, 20b are intermeshed with each other. Along the circumferential direction of the stator, the teeth 24 of the outer and inner yokes 20a, 20b of the claw-pole assembly 20 are arranged alternately, and are misaligned from each other by an electrical angle of 180°. The teeth 24 of the yokes 20a, 20b of the claw-pole assembly 20 cooperatively form a cylinder-shaped sidewall 27 for coils (not shown) to wind therearound. The circular holes of the yokes 20a, 20b cooperatively define an inner space 21 for receiving the rotor therein. A narrow gap 29 is defined between each two neighboring pole teeth 24. The two claw-pole assemblies 20 are arranged back-to-back and are misaligned from each other by an electrical angle of 90°. The inner yokes 20b of the two claw-pole assemblies 20 abut each other. The cutouts 26 of the yokes 20a, 20b are aligned with each other, and the through holes 25 of the yokes 20a, 20b are aligned with each other along an axial direction of the stator.

The sleeve bearing 60 is made by metal or ceramic sintering and has a plurality of micro pores (not shown) therein, which are impregnated with lubricant oil. The sleeve bearing 60 defines a bearing hole 61 therethrough with a diameter being approximately the same as that of a shaft of the rotor. The bearing hole 61 is used for receiving the shaft to extend therethrough. The sleeve bearing 60 includes an upper portion 63 and a lower portion 65. An inner diameter and an outer diameter of the upper portion 63 of the sleeve bearing 60 are smaller than those of the lower portion 65 of the sleeve bearing 60. Thus an inner surface and an outer surface of the sleeve bearing 60 each are step-shaped. The upper and lower portions 63, 65 of the sleeve bearing 60 respectively define annular grooves 64, 62 in top sides thereof.

The fixing structure 10 includes a connecting portion 70 contained in the gaps 29 between the pole teeth 24 and the through holes 25 of the yokes 20a, 20b, a base 30 arranged at a bottom side of the stator, and a tube 50 extending upwardly from a center of the base 30. The tube 50 is integrally formed with the base 30 and the connecting portion 70, and is fixedly adhered to the outer surface of the sleeve bearing 60. The tube 50 is hollow, and a mounting hole 31 is defined through the tube 50 and a center of the base 30. The mounting hole 31 has a diameter lager than that of the bearing hole 61. The tube 50 has an upper portion 54 and a lower portion 52. The lower portion 52 has an outer diameter being larger than that of the upper portion 54 of the tube 50 and thus to support a shell of the rotor thereon. An inner side of the lower portion 52 of the tube 50 defines a concave (not labeled) conformably receiving the sleeve bearing 60 therein. An inner surface of the lower portion 52 of the tube 50 is step-shaped. Two annular flanges 42, 44 are formed on the steps of the inner surface of the lower portion 52 of the tube 50 and are respectively received the grooves 62, 64 of the sleeve bearing 60 to firmly secure the sleeve bearing 60 in position.

The fixing structure 10 is integrally formed by insert molding and thus it fixedly combines the claw-pole assemblies 20 and the sleeve bearing 60 together to form an integral motor stator. During forming of the fixing structure 10, the yokes 20a, 20b are intermeshed with each other with the gaps 29 defined therebetween to form the two claw-pole assemblies 20, and the two claw-pole assemblies 20 are arranged back-to-back. The sleeve bearing 60 is arranged in the inner space 21 of the claw-pole assemblies 20 and located at a central portion thereof. The sleeve bearing 60 is permeated with a predetermined amount of lubricate oil. Then the sleeve bearing 60 and the claw-pole assemblies 20 are mounted in a mold which is used for forming the fixing structure 10 onto the sleeve bearing 60 and the claw-pole assemblies 20 by insert molding. The mold has a chamber for injecting molten plastic thereinto. After cooling, the molten plastic in the chamber forms the fixing structure 10. Thus the sleeve bearing 60 is received and fixedly connected to the tube 50 during the process of insert molding the fixing structure 10, and the sleeve bearing 60 and the tube 50 are integrally connected together. The trouble and inconvenience in assembling the sleeve bearing and the tube of the conventional art is avoided by the present invention. In the present invention, the sleeve bearing 60 is assembled with the rotor precisely and securely, and production and assembly of the motor stator are both easy and convenient.

A pin holder 12 is integrally formed at the cutouts 26 of the yokes 20a, 20b with the fixing structure 10 during the insert molding for forming the fixing structure 10. Several holes 11 are defined in the pin holder 10 for receiving pins therein. The pins each has one end to be connected to an end of the coils, and another end for connecting the coils to a power source electrically. Thus a current can be applied to the coils to generate an alternating magnet field to drive the rotor to rotate during operation of the motor.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motor stator comprising:
   at least one claw-pole assembly for coils wound thereon, the at least one claw-pole assembly comprising a pair of yokes facing towards each other, each of the yokes being ring-shaped, a plurality of pole teeth extending from each of the yokes, the pole teeth of the two yokes being intermeshed with each other with a gap defined between two adjacent pole teeth, and being arranged in alternating fashion along a circumferential direction of the yokes to cooperatively form a cylinder-shaped sidewall for the coils wound therearound, the sidewall defining an inner space for receiving a rotor therein;
   an integral fixing structure made of plastic material by insert molding comprising a connecting portion contained in the gaps between the pole teeth, a base formed at an end of the inner space, and a tube extending from the base into the inner space, wherein the connecting portion, the base and the tube are monolithic, and the tube comprises an upper portion and a lower portion with an inner diameter larger than that of the upper portion; and
   a sleeve bearing being fixedly embedded in the lower portion of the tube during the process of insert molding the fixing structure, the sleeve bearing defining a bearing hole for rotatably supporting a shaft of the rotor;
   wherein an outer surface of the sleeve bearing is step-shaped, an annular groove being defined in each step of the outer surface of the sleeve bearing, the lower portion of the tube having a step-shaped inner surface corresponding to the outer surface of the sleeve bearing, an annular flange being formed on each step of the inner surface of the lower portion of the tube and being received in a corresponding groove of the sleeve bearing.

2. The motor stator as claimed in claim 1, wherein an outer diameter of the lower portion of the tube of the fixing structure is larger than that of the upper portion.

3. The motor stator as claimed in claim 1, wherein a mounting hole is defined in the base and the tube of the fixing structure for the shaft of the rotor to extend therethrough.

4. The motor stator as claimed in claim 3, wherein a diameter of the mounting hole is larger than the bearing hole of the sleeve bearing.

5. The motor stator as claimed in claim 1, wherein a pin holder is integrally formed with the fixing structure for receiving pins adapted for electrically connecting the coils with a power source.

6. The motor stator as claimed in claim 1, wherein the yokes defines a plurality of through holes therein, and the fixing structure comprises a portion contained in the through holes.

7. The motor stator as claimed in claim 1, wherein the motor has two claw-pole assemblies arranged back-to-back.

8. A stator for a motor, comprising:
at least one claw-pole assembly for coils wound thereon, the at least one claw-pole assembly comprising a pair of yokes facing towards each other, each of the yokes being ring-shaped, a plurality of pole teeth extending from each of the yokes, the pole teeth of the two yokes being intermeshed with each other with a gap defined between two adjacent pole teeth, the at least one claw-pole assembly defining an inner space for receiving a rotor therein;
an integral fixing structure made of plastic material insert molded with the at least one claw-pole assembly, comprising a connecting portion contained in the gaps between the pole teeth, a base formed at an end of the inner space, and a tube extending from the base into the inner space, wherein the connecting portion, the base and the tube are monolithic, and the tube comprises an upper portion and a lower portion with an inner diameter larger than that of the upper portion; and
a sleeve bearing being fixedly embedded in the lower portion of the tube, the sleeve bearing defining a bearing hole for rotatably supporting a shaft of the rotor
wherein an outer surface of the sleeve bearing is step-shaped, the lower portion of the tube having a step-shaped inner surface corresponding to the outer surface of the sleeve bearing, an annular groove and an annular flange received in the annular groove formed between the outer surface of the sleeve bearing and the inner surface of the tube.

9. The stator as claimed in claim 8, wherein the sleeve bearing comprises an upper portion and a lower portion, an inner diameter and an outer diameter of the upper portion of the sleeve bearing smaller than those of the lower portion of the sleeve bearing, the annular groove being defined in top side of the upper portion of the sleeve bearing, another annular groove being defined in top side of the lower portion of the sleeve bearing.

10. The stator as claimed in claim 9, wherein the inner surface of the lower portion of the tube comprises first and second steps corresponding to the top sides of the upper and lower portions of the sleeve bearing, respectively, the flange being formed on the first step, another flange being formed on the second step, the flanges received in the grooves of the sleeve bearing, respectively.

* * * * *